(12) United States Patent
Shimoda

(10) Patent No.: US 9,325,959 B2
(45) Date of Patent: Apr. 26, 2016

(54) RECORDING AND REPRODUCING APPARATUS

(71) Applicant: Hitachi, Ltd., Tokyo (JP)

(72) Inventor: Nozomu Shimoda, Ninomiya (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 13/732,573

(22) Filed: Jan. 2, 2013

(65) Prior Publication Data
US 2013/0121659 A1    May 16, 2013

Related U.S. Application Data

(63) Continuation of application No. 12/336,694, filed on Dec. 17, 2008, now abandoned.

(30) Foreign Application Priority Data

Dec. 19, 2007  (JP) .................................. 2007-326955

(51) Int. Cl.
| | | |
|---|---|---|
| H04N 9/87 | (2006.01) | |
| H04N 5/765 | (2006.01) | |
| H04N 5/77 | (2006.01) | |
| H04N 21/231 | (2011.01) | |
| H04N 21/24 | (2011.01) | |

(Continued)

(52) U.S. Cl.
CPC ................ *H04N 9/87* (2013.01); *H04N 5/765* (2013.01); *H04N 5/772* (2013.01); *H04N 21/23106* (2013.01); *H04N 21/2402* (2013.01); *H04N 21/4147* (2013.01); *H04N 21/42661* (2013.01); *H04N 21/6587* (2013.01); *H04N 5/781* (2013.01)

(58) Field of Classification Search
CPC ......... H04N 9/87; H04N 5/765; H04N 5/772; H04N 5/781; H04N 5/782; H04N 21/23106; H04N 21/2402; H04N 21/4147; H04N 21/42661; H04N 21/6587
USPC .................................................. 386/299, 270
See application file for complete search history.

(56) References Cited

U.S. PATENT DOCUMENTS

7,457,512 B2    11/2008  Fujimoto
7,958,269 B2 *   6/2011  Nakamura .................... 709/247
(Continued)

FOREIGN PATENT DOCUMENTS

| CN | 1222030 A | 7/1999 |
|---|---|---|
| JP | 2000-138630 A | 5/2000 |

(Continued)

*Primary Examiner* — Thai Tran
*Assistant Examiner* — Nien-Ru Yang
(74) *Attorney, Agent, or Firm* — Kilpatrick Townsend & Stockton LLP

(57) ABSTRACT

To provide a recording and reproducing apparatus capable of storing AV data reliably during recording and capable of reading the AV data reliably during reproducing even when the communication state between the video camera and a network is bad, the recording and reproducing apparatus neither failing to record nor reproduce AV data, the recording and reproducing apparatus improving the recording reliability and reproduction reliability of AV data. With a unit for determining whether the communication state is good or bad, the recording and reproducing reliability is improved by carrying out recording and reproducing of AV data to a hard disk of the recording and reproducing apparatus by utilizing a built-in hard disk when the communication state is bad.

5 Claims, 11 Drawing Sheets

(51) Int. Cl.
*H04N 21/4147* (2011.01)
*H04N 21/426* (2011.01)
*H04N 21/6587* (2011.01)
*H04N 5/781* (2006.01)

(56) References Cited

U.S. PATENT DOCUMENTS

2003/0149988 A1 8/2003 Ellis et al.
2004/0174442 A1* 9/2004 Chosa .................. 348/231.1
2005/0063665 A1* 3/2005 Fujimoto .................. 386/46
2005/0141875 A1* 6/2005 Fukushima .................. 386/94

FOREIGN PATENT DOCUMENTS

| | | |
|---|---|---|
| JP | 2004-266761 A | 9/2004 |
| JP | 2005-318380 A | 11/2005 |
| JP | 2006-287876 A | 10/2006 |
| JP | 2007-067916 A | 3/2007 |
| JP | 2008-124814 A | 5/2008 |

* cited by examiner

RECORDING AND REPRODUCING APPARATUS

INCORPORATION BY REFERENCE

This application is a continuation application of U.S. patent application Ser. No. 12/336,694, filed on Dec. 17, 2008, which claims priority from Japanese Application No. 2007-326955, filed on Dec. 19, 2007, the content of which is hereby incorporated by reference into this application.

BACKGROUND OF THE INVENTION

The present invention relates to recording and reproducing apparatuses.

Examples of a video camera that transmits and receives data to and from an external storage unit via communication means include the one described in JP-A-2007-67916. JP-A-2007-67916 discloses a digital camera having a function to store data on a recording medium provided by the video camera and transfer the stored data to an external storage unit.

SUMMARY OF THE INVENTION

In recent years, the recording capacity of a small-sized hard disk has been increasing from year to year, and a video camera employing a hard disk as the recording medium of AV data, i.e., the so-called hard disk camera, is emerging.

The greatest advantage of the hard disk is the size of its recording capacity. Because of this advantage, the hard disk can store long-hour AV data as compared with other recording media and also can store high quality AV data, and is therefore suitable as the recording medium of the video camera.

On the other hand, the hard disk is typically incorporated into a camera because it is expensive. Therefore, it is not easy to carry about only the recorded data. Furthermore, if the full capacity of the hard disk is already consumed, new AV data cannot be recorded on the hard disk unless unnecessary AV data is deleted. In this way, the preservability of AV data recorded on the hard disk is not sufficient.

As the video camera utilizing the advantage of such a hard disk camera and furthermore making up for its disadvantage, a hybrid type video camera with two recording media of a DVD and a hard disk can be contemplated.

On the other hand, if a video camera includes a hard disk and a DVD drive, the mechanism of the video camera body becomes complicated and its size and weight also will increase.

Then, there is a network-compatible video camera that stores data of the video camera in a large capacity storage unit on a network. This type of video camera has an advantage in that it does not require a plurality of storage media or a large capacity storage medium in the camera body even in storing high quality and large-capacity AV data.

In the network-compatible video camera, if the communication state between the video camera and a network is bad, the video camera cannot record AV data or cannot reproduce the same.

It is an object of the present invention to provide a recording and reproducing apparatus capable of storing AV data reliably during recording and capable of reading the AV data reliably during reproducing even when the communication state between the video camera and a network is bad.

A recording and reproducing apparatus of the present invention comprises a transmitting and receiving unit that transmits recorded information comprising image information input from an image sensor and audio information input from an audio input unit to other equipment or receives reproduction information from other equipment; a recording medium for recording the recorded information; and a reproducing unit that reproduces reproduction information received by the transmitting and receiving unit and information recorded on the recording medium. This recording and reproducing apparatus further comprises a recording and reproducing control unit which monitors the transmission and reception status of the transmitting and receiving unit, the information recordable capacity of the other equipment, and the recordable capacity of the recording medium, respectively, and which then carries out a recording control of the recorded information or a reproduction control of reproduction information.

Other objects, features and advantages of the invention will become apparent from the following description of the embodiments of the invention taken in conjunction with the accompanying drawings.

DESCRIPTION OF THE INVENTION

Figure 1:
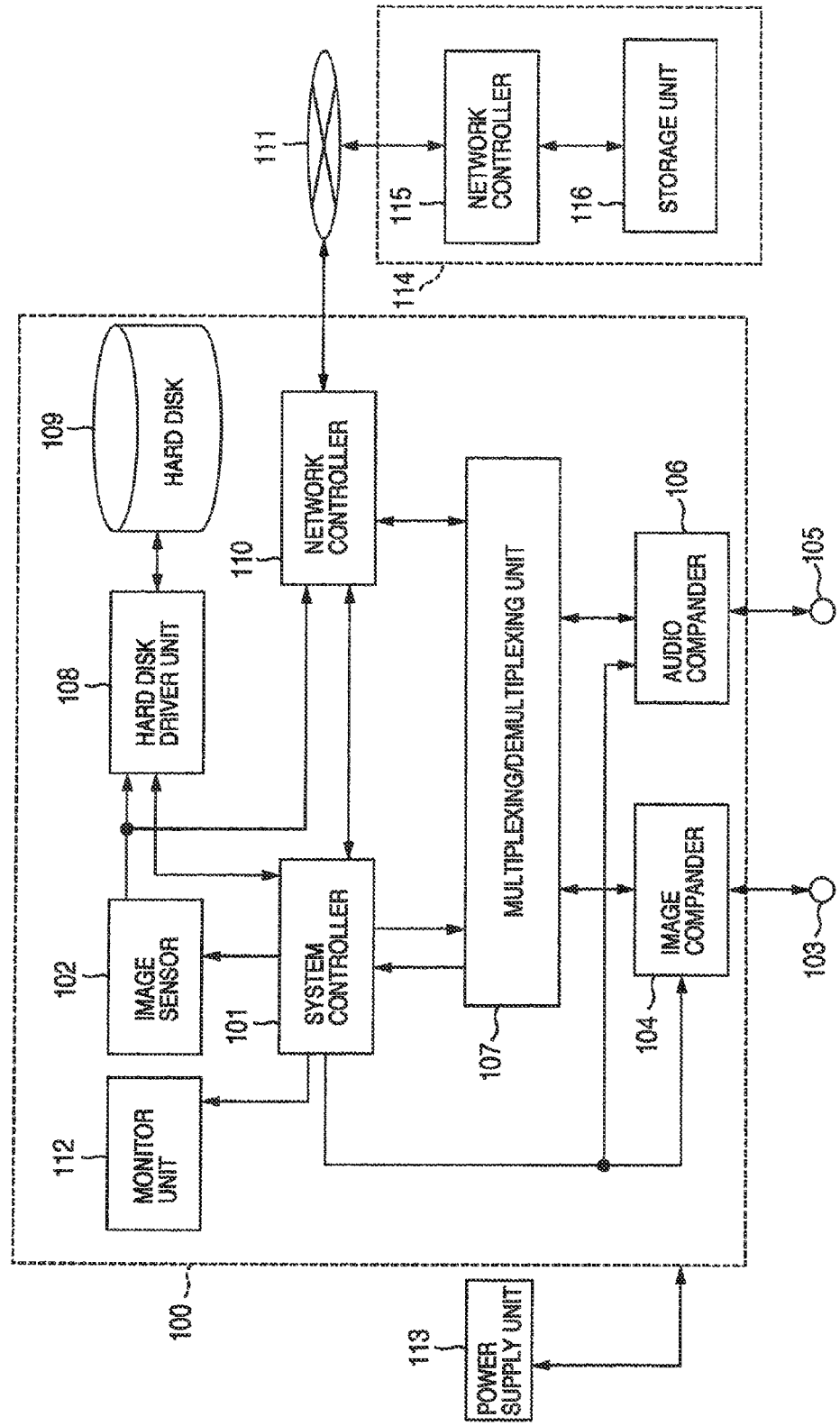
FIG. 1 is a block diagram showing a schematic configuration of a network-compatible video camera according to a first embodiment.

With reference to FIG. 1, the embodiments (a first embodiment and a second embodiment) of a recording and reproducing apparatus of the present invention will be described taking a network-compatible digital video camera 100 with a hard disk 109 (hereinafter, also simply referred to as a "video camera") as an example.

First Embodiment

Configuration of the Video Camera 100

In FIG. 1, reference numeral 100 represents a video camera (recording and reproducing apparatus). A system controller 101 includes a CPU (Central Processing Unit), a memory, and the like, and controls the entire system. An image sensor 102 images a subject, and converts the imaging information from an optical signal to an electric signal and also converts an analog electric signal to a digital signal.

An image input/output terminal 103 inputs/outputs a digital video signal that is compressed/expanded in an image compander 104. An audio input/output terminal 105 inputs/outputs a digital audio signal that is compressed/expanded in an audio compander 106. A multiplexing/demultiplexing unit 107 multiplexes the image compression data and the audio compression data, which are output from the image compander 104 and the audio compander 106, respectively, and generates stream data, or demupltiplexes the stream data into image compression data and audio compression data, and inputs the respective data to the image compander 104 and the audio compander 106.

A hard disk driver unit 108, during AV data recording, writes the stream data and various kinds of information files, which the multiplexing/demultiplexing unit 107 generated via the system controller 101, onto the hard disk 109 in predetermined forms, or during AV data reproduction, the hard disk driver unit 108 reads the stream data and various kinds of information files recorded on the hard disk 109. A network controller 110 connects to a network 111, transmits the AV data via the network from the video camera during recording, and transmits the AV data via the network to the video camera during reproduction.

The files obtained by digitally compressing AV data, such as video information and audio information, the management information of these AV data, and the like are mainly recorded on the hard disk 109.

A monitor unit 112 displays a GUI (Graphical User Interface), such as a menu of the recording and reproducing apparatus 100, or the video information input to the image sensor 102, during recording, or the video information transmitted via a network, the video information reproduced from the hard disk, and the like, during reproduction.

A power supply unit 113 supplies a power source, such as a battery or an AC power source, for driving the recording and reproducing apparatus.

A server 114 on the network 111 includes a network controller 115 and a storage unit 116. Thereby, during recording, the AV data transmitted from the recording and reproducing apparatus 100 via the network 111 and the network controller 115 can be stored in the storage unit 116, or during reproduction, the AV data stored on the storage unit 116 can be read and transmitted via the network to the recording and reproducing apparatus 100.

Figure 2:
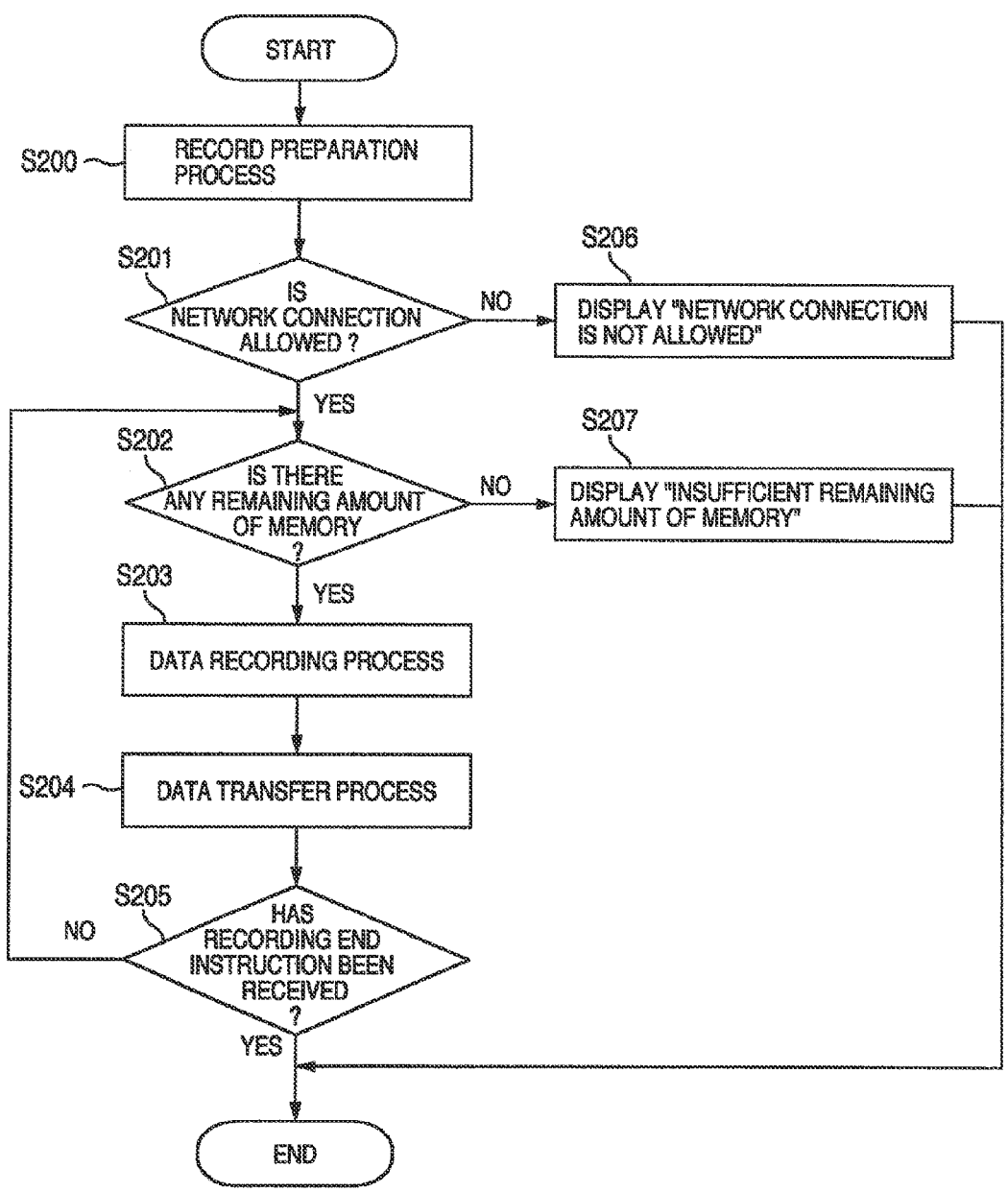
FIG. 2 is a process flowchart when AV data is recorded on a server on a network according to the first embodiment.

FIG. 2 is a recording process flowchart of AV data in the video camera 100 of the first embodiment. Upon receipt of an AV data recording start instruction from a user, the system controller starts a series of AV data recording processes.

First, a record preparation process is carried out in step S200. In the record preparation process carried out here, the system controller 101 collects the information that is set by a user in advance, e.g., the types of a moving image and a static image, the recording image quality, the archive destination of AV data, and the like, and then carries out initialization process to various kinds of hardware or software in accordance with this information.

Next, in Step S201, the system controller 101 issues an instruction to the network controller 110 to confirm whether the connection to the network 111 is possible or not, then the network controller 110 confirms whether the connection to the network 111 is possible or not, and if the network connection is allowed, the flow proceeds to Step S202, and if not allowed, the flow proceeds to Step S206.

If the network connection is allowed in Step S201, then, in Step S202, the system controller 101 confirms the remaining amount of the storage unit 116 which the server 114 on the network has. If the remaining amount of the storage unit 116 is no less than a threshold value, the flow proceeds to Step S203, and if the remaining amount is less than the threshold value, the flow proceeds to Step S207. Note that the threshold value is set in the video camera in advance. Of course, an interface that allows a user to change this value to a value which he/she can easily use may be provided. Furthermore, the threshold value may be varied depending on the circumstances of the server 114 on the network.

Next, in Step 203, the AV data recording process is started. When the recording process is started, the image compander 104 compresses a video signal input from the image input/output terminal 103 and the audio compander 106 compresses an audio signal input from the audio input/output terminal 105, thereby generating image compression data and audio compression data, respectively, which are then input to the multiplexing/demultiplexing unit 107. The multiplexing/demultiplexing unit 107 multiplexes the input image compression data and audio compression data to generate stream data. The generated stream data is sequentially passed to the network controller 110. After appropriately converted to a format suitable for data transfer, the stream data passed to the network controller 110 is sequentially transferred from the network controller 110 to the server 114 on the network 111 in the AV-data transfer process of Step S204.

The transferred stream data is stored on the storage unit 116 via the network controller 115 of the server 114. Next, in Step 205, a process to confirm whether or not an AV data recording end instruction has been received from a user during AV-data recording is carried out. If the recording end instruction has been received, the generated stream data is transferred to the server 114 on the network and the recording process is terminated. On the other hand, if the recording end instruction has not been received, the processes of Step S202 to Step S205 are repeated.

Note that, if the network connection could not been made in the network connection confirming process in Step S201, then in Step S206, a message for conveying to a user a fact that the network connection could not been made and thus the AV data recording process cannot be started is displayed on the monitor unit 112 or the like, and thereafter the AV-data recording process is terminated.

On the other hand, if the remaining amount is less than the threshold value in the process of confirming the remaining amount of the storage unit in Step S202, then in Step S207, a message for conveying to a user a fact that the remaining amount of the storage unit is insufficient and thus the AV data recording process cannot be started is displayed on the monitor unit 112 or the like, and thereafter the AV-data recording process is terminated. Of course, the information notification to a user in Step 206 or Step 207 is not limited to displaying on the monitor unit 112, and a notification by voice or other means may be employed as long as the information notification is possible.

Alternate Embodiment 1

The basic process control according to the first embodiment has been described above. In this basic process control, the network connection confirming process of Step S201 in FIG. 2 has an important meaning. For example, in school events, such as an athletic meet or an arts festival, it is assumed that many users utilize the network-compatible video cameras simultaneously. In this case, a situation is likely to occur in which the communication between a video camera and a network server does not work well due to an effect of an increase in the number of network users.

Figure 3:
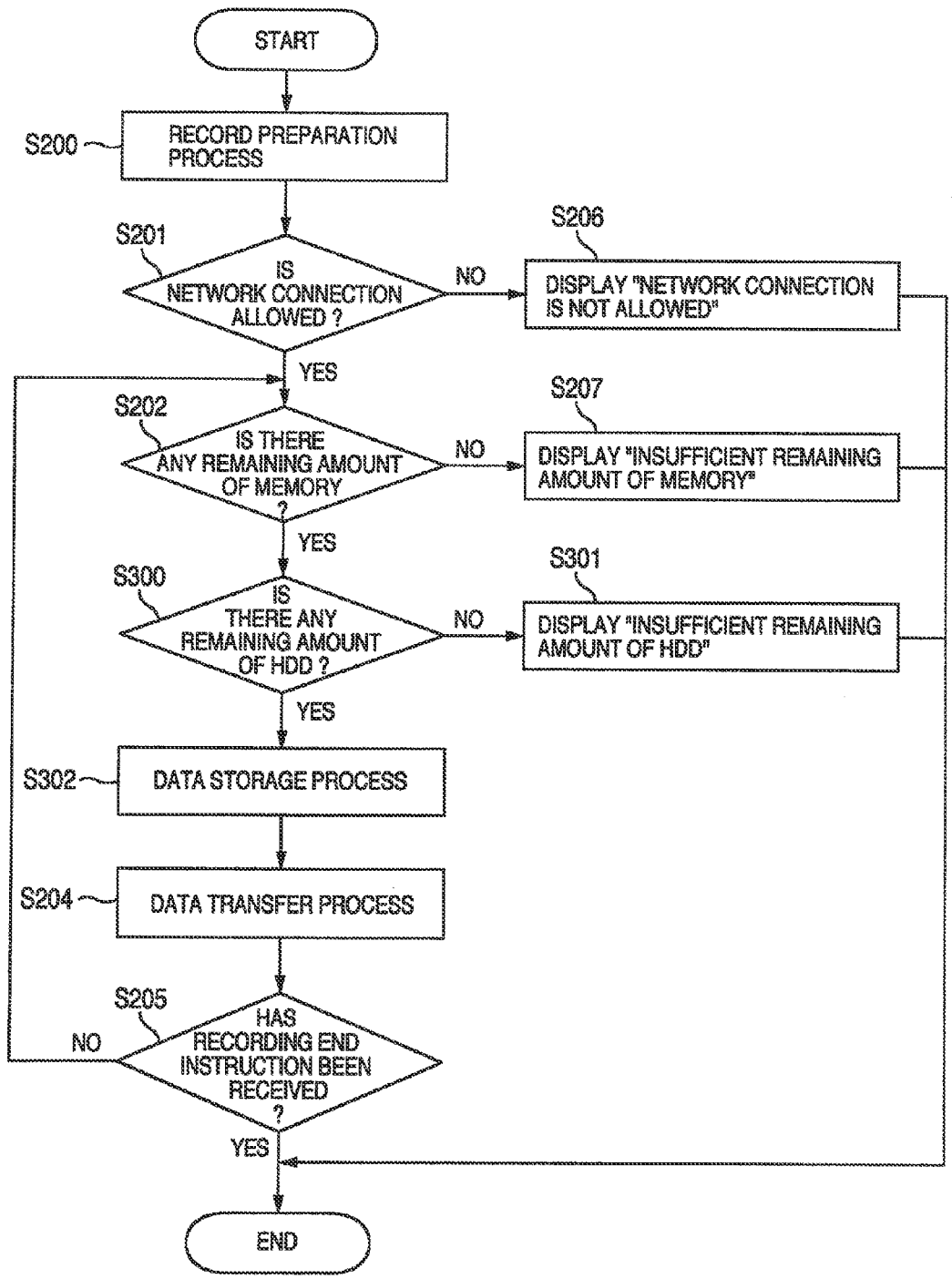
FIG. 3 is a process flowchart when AV data is recorded on a built-in hard disk and on the server on the network, according to an alternate embodiment 1.

In such a case, a fact that network connection cannot be made with the process flow shown in FIG. 2 directly leads to an inability to record AV data, and thus a user cannot record AV data although he/she desires to do so. In order to cope with such a situation, for example, the recorded AV data may be transferred not only to the server 114 on the network 111 through the process flow shown in FIG. 2, but also be recorded on the hard disk 109 incorporated in the video camera. FIG. 3 shows a control flow of such a recording process.

In FIG. 3, Step S200 to Step S202 and Step S204 to Step S207 are the same as the processing content of FIG. 2, and the detailed description is omitted.

In Step S300, a process to confirm the remaining amount of the hard disk 109 incorporated in the video camera serving as the archive destination of AV data is carried out. If the remaining amount is no less than a threshold value, the flow proceeds to Step S302, and if the remaining amount is less than the threshold value, the flow proceeds to Step S301. Note that the threshold value is set in the video camera in advance. Of course, an interface that allows a user to change this value to a value which he/she can easily use may be provided.

Next, in Step 302, the storage of the stream data, i.e., a writing process, is carried out to the hard disk 109. Note that the content of the stream data stored in step S302 are the same as that of the stream data transferred to the server in the next step S204. Here, Step S302 and Step S204 are in random order, and whichever may be carried out first.

Note that, if the remaining amount is less than the threshold value in the hard disk remaining amount confirming process in Step S300, then in Step S301, a message for conveying to a user a fact that the remaining amount of the built-in hard disk is insufficient and thus the AV data recording process cannot be started is displayed on the monitor unit 112 or the like, and thereafter the AV-data recording process is terminated. By carrying out the control as described above, the video camera can record AV data on the built-in hard disk even if a situation occurs in which the communication between the video camera and the network server does not work well. Accordingly, a user will not miss shooting a scene crucial to himself/herself, and the recording reliability as the video camera can be maintained.

Alternate Embodiment 2

In the process (process flow of FIG. 3) in the above-described alternate embodiment 1, unless the recording conditions of both the network server and the built-in hard disk are satisfied simultaneously, the AV data recording process will not be carried out.

That is, if the communication with the network server is not allowed, the process moves from Step S201 to Step S206 in FIG. 3, and the recording process itself will be terminated without being carried out regardless of the remaining amount of the built-in hard disk. Moreover, also in the case where the network connection is allowed but there is no remaining amount of the storage unit 116, the recording process itself will be terminated without being carried out regardless of the remaining amount of the built-in hard disk. Moreover, even when the AV data can be recorded on the server on the network, if there is no remaining amount of the storage unit, the recording process itself is terminated in step S301.

Figure 4:
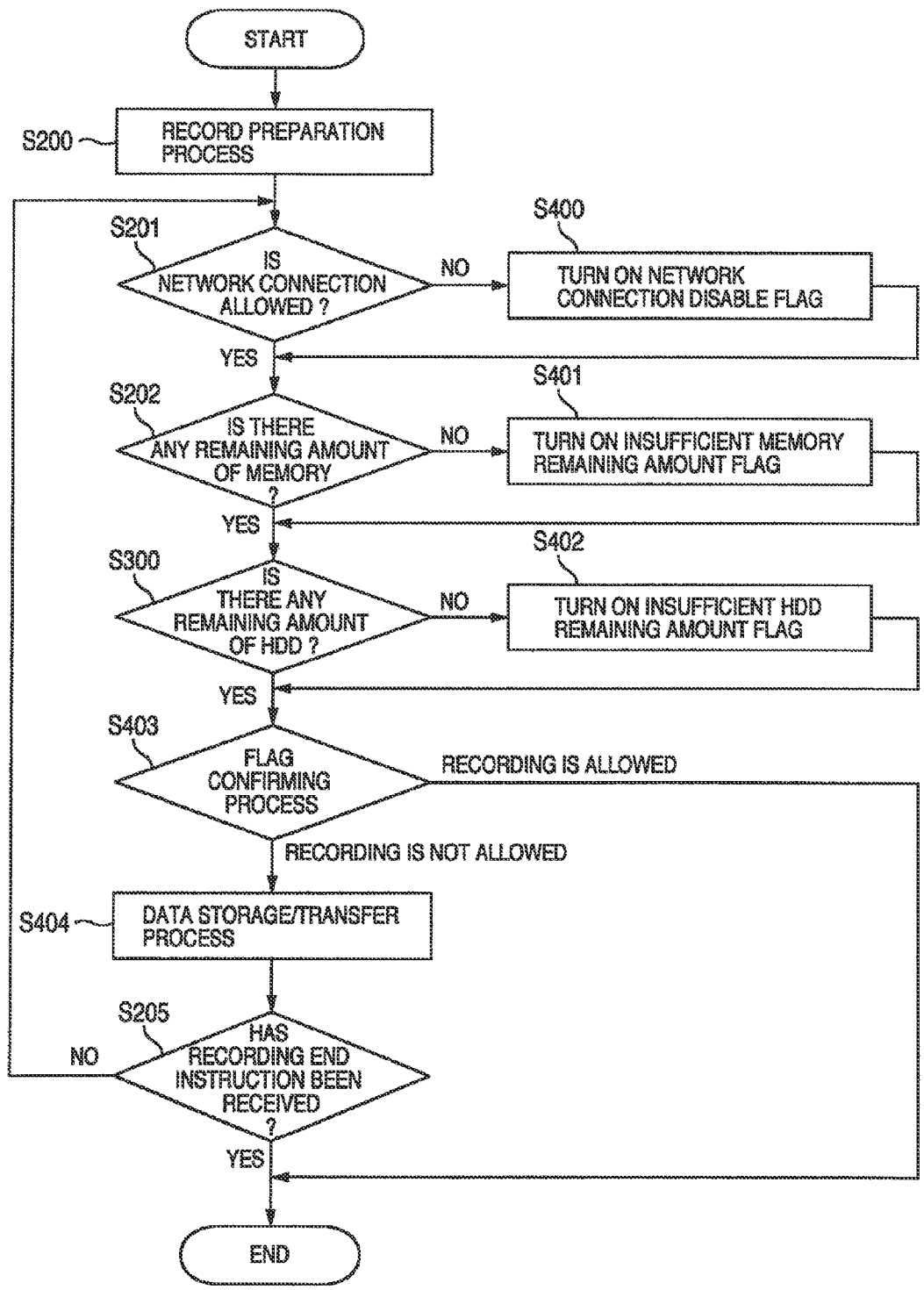
FIG. 4 is a process flowchart, including a record availability flag determination process, when AV data is recorded on the built-in hard disk and on the server on the network, according to an alternate embodiment 2.

Then, in the alternate embodiment 2, the process flow as shown in FIG. 4 is employed.

In the process flow shown in FIG. 4, if AV data can be recorded onto either of the server on the network or the built-in hard disk 109, the recording process can be carried out. Thereby, for example, even if communication between the video camera and the network server does not work well, AV data can be recorded on the built-in hard disk 109, or even if there is no remaining amount of the built-in hard disk, AV data can be recorded on the network server.

In FIG. 4, Step S200 to Step S202, Step S205, Step S300, and Step 302 are the same as the processing content of FIG. 3, and the detailed description is omitted.

In FIG. 4, if it is determined that the network connection cannot be made in the network connection confirming process in Step S201, the flow proceeds to Step S400. In Step S400, a network connection disable flag is turned ON. All the flags, including the network connection disable flag, used in the subsequent description are recorded in advance, for example, on the memory, the hard disk 109, or the like provided by the system controller 101.

Likewise, if it is determined in step S202 that the remaining amount of the storage unit 116 is less than a threshold value, the flow proceeds to Step S401 and a storage-device remaining amount shortage flag is turned ON, and if it is determined in step S300 that the remaining amount of the hard disk 109 is less than the threshold value, the flow proceeds to Step S402 and an HDD remaining amount shortage flag is turned ON.

Note that, here, only steps of turning ON the respective flags are shown, however, of course, if the above determination is repeatedly made, then the flag will be in the reset state (OFF state). For example, with regard to FIG. 4, a step of "turning OFF all the flags" may be included immediately before Step S201 (downstream from an arrow returning from Step S205).

Next, a flag confirming process is carried out in step S403. The flag confirming process is a process to check the ON/OFF states of three kinds of flags: the network connection disable flag, the storage-device remaining amount shortage flag, and the HDD remaining amount shortage flag. Here, if both the network connection flag and the storage-device remaining amount shortage flag are OFF, and if the HDD remaining amount shortage flag is OFF, and if all the flags are OFF, then it is determined that AV data can be recorded and the flow proceed to Step S404. On the other hand, if it is determined that AV data cannot be recorded, the AV data recording process is terminated. In Step S404, a stream data storing/transferring process is carried out based on the result of the flag confirming process. For example, if the conditions that the communication state with the server 114 on the network 111 is good and also that the remaining amount of the storage unit 116 is no less than a threshold value are satisfied, the transfer of stream data is carried out, and if the condition that the remaining amount of the hard disk 109 is no less that the threshold value is satisfied, the storage of stream data is carried out. Of course, if the two conditions are satisfied simultaneously, the transfer and storage of the stream data are carried out simultaneously. With the above-described means, if at least one of the network server and the built-in hard disk is in the recordable state, the recorded AV data can be stored. As a result, the recording reliability as the video camera will be increased.

Note that, theoretically, there are three kinds of flag states, and therefore, as shown in Table 1, $2^3=8$ kinds of patterns can be contemplated (including the duplicated responses).

TABLE 1

| S400 | S401 | S402 | response |
|------|------|------|----------|
| ON | ON | ON | recording is not allowed |
| ON | ON | OFF | record on hard disk |
| ON | OFF | ON | recording is not allowed |
| ON | OFF | OFF | record on hard disk |
| OFF | ON | ON | recording is not allowed |
| OFF | ON | OFF | record on hard disk |
| OFF | OFF | ON | record on server |
| OFF | OFF | OFF | record on server and hard disk |

Alternate Embodiment 3

In the examples in FIG. 2 (first embodiment), in FIG. 3 (alternate embodiment 1), and in FIG. 4 (alternate embodiment 2), a situation where the communication between the video camera 100 and the network server 114 does not work well is determined only based on the connection availability of Step S201 (see FIG. 2 to FIG. 4), however, such determination and control method may not be flexible. For example, the communication state between the video camera and the network server may irregularly vary from a good state (communication is stable) to a bad state (communication is unstable), or vice versa, except when the network server is down, for example. In order to correspond to such an irregular change in the communication state, a control as shown in FIG. 5 may be carried out.

Figure 5:
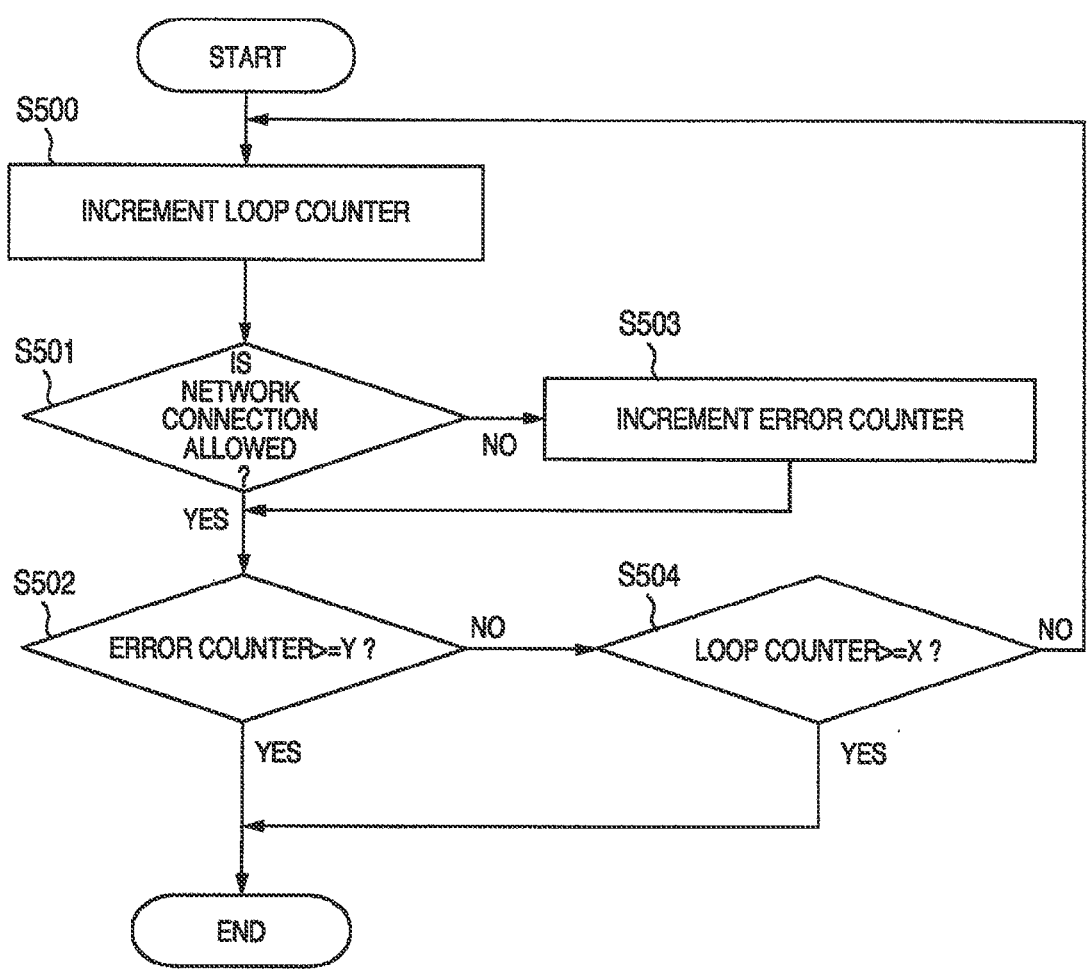
FIG. 5 is a process flowchart when a communication status is determined based on the number of times having consecutively failed in communication, according to an alternate embodiment 3.

In FIG. 5, a loop counter and an error counter are initialized to zero in advance. First, the loop counter is incremented in step S500, and then a network connection availability confirming process is carried out in step S501. As a result of confirmation, if the connection could not be made, the flow proceeds to Step S503 and the error counter is incremented.

Next, in Step S502, it is determined whether or not the error counter is no less than a given value Y. As a result, if the error counter is no less than Y, the process is terminated, and if it is less than Y, the flow proceeds to Step S504 and it is determined whether or not the loop counter is no less than a given value X. As a result, if the error counter is no less than X, the process is terminated, and if it is less than X, the processes after Step S500 are carried out again. In the network-compatible video camera 100 using such a process flow replacing the above-described Step S201 (see FIG. 2 to FIG. 4), for example, in the case of Y=5, X=100, only if having failed to connect to the network 5 times in a row while determining the availability of the network connection 100 times, it can be determined that the communication state with the network server is bad, thereby preventing AV data from being recorded.

This makes it possible to correspond to an irregular change in the communication state between the video camera and the network server. As a result, for example, the following control can be performed easily and reliably: when the communication state is good, stream data is recorded on the server on the network, and when the communication state is bad, the stream data is recorded on the built-in hard disk. Of course, the values of the error counter and the loop counter are not limited to those of the above-described example, and the same effect is obtained also using a value arbitrarily set for each system. Moreover, the video camera may include a function to allow a user to freely set a value from a menu screen or the like of the video camera.

The control flow shown in FIG. 5 may be carried out before Step S404 of FIG. 4, for example, and the execution timing is not limited in particular.

In determining whether the communication state is good or bad, other condition may be set instead of how many times in a row the video camera has failed in communication. For example, a date or time may be introduced as a condition so that "if the video camera has failed in communication N times a day, it is determined that the communication state is bad" or "if the video camera has failed in communication N times within a certain time period, it is determined that the communication state is bad." Of course, the condition described above may be combined with the condition "if the video camera has failed in communication N times within a certain time period, it is determined that the communication state is bad."

In the present invention, the network-compatible video camera determines whether the communication state between the video camera and the network server is good or bad, and when it is determined that the communication state is good, the video camera can transfer and record AV data onto the storage unit on the network server, and when it is determined that the communication state is bad, the video camera can record the AV data on the built-in hard disk. That is, the video camera can reliably record AV data without depending on whether the communication state is good or bad.

Second Embodiment

Hereinafter, a second embodiment of the present invention is described. In the second embodiment, since the schematic configuration of the video camera 100 is the same as that of FIG. 1, the description of the configuration is omitted.

As shown in the first embodiment, the function to determine whether the communication state between the video camera 100 and the network server 114 is good or bad and then reliably record AV data is hereafter referred to as "secure record". By always turning ON the secure record, the recording reliability will be improved, thus providing great advantage for a user.

Depending on a user, when the user desires to turn OFF the secure record, a situation may occur in which there is data in the video camera's built-in hard disk which the user can in no way delete, for example. Therefore, for example, it is convenient if a user can switch the ON and OFF of the secure record from a menu screen or the like of the video camera in advance.

In this case, the secure record ON/OFF setup information is recorded in advance on the memory, the hard disk 109, or the like provided by the system controller 101. Here, a recording process flow taking into consideration the secure record ON/OFF setup information is shown in FIG. 6.

Figure 6:
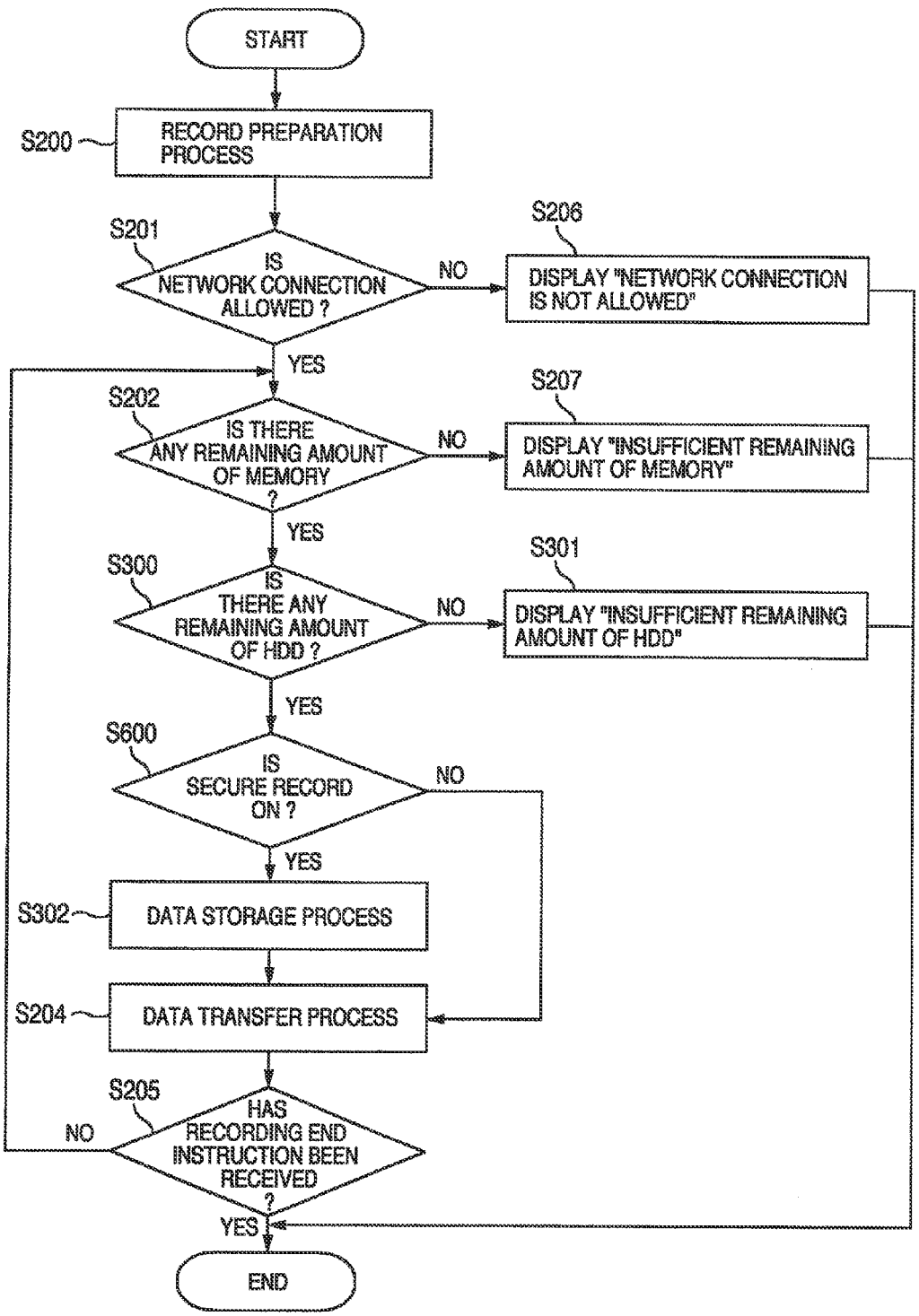
FIG. 6 is a recording control process flowchart based on secure record setting information according to a second embodiment.

FIG. 6 is the process flow of FIG. 3 plus Step S600.

In Step S600, a process to confirm the secure record ON/OFF setup information is carried out. The secure record ON/OFF setup information may be read from the memory provided by the system controller 101, as described above. If the secure record is ON, then in step S302 the recorded stream data is stored onto the built-in hard disk, and thereafter in step S204 the recorded stream data is transferred to the network server. Of course, Step S302 and Step S204 are in random order, and whichever may be carried out first.

In this way, if the secure record is turned ON, the video camera is controlled so that the same stream data may be stored on both the server on the network and the built-in hard disk. On the other hand, in Step S600, if the secure record is OFF, the process of storing the stream data onto the hard disk in Step S302 is not carried out, but only the process of transferring the stream data to the network server in Step S204 is carried out. In this way, when the secure record is turned OFF, the video camera is controlled so that the stream data is stored only on the server on the network, but not recorded on the built-in hard disk. As described above, with the described process, the archive destination of stream data can be changed based on the secure record ON/OFF setup information.

Note that, here, a case where the secure record ON/OFF setup information confirming process of Step S600 is added to the process flow of FIG. 3 has been described as an example, however, the secure record ON/OFF setup information confirming process can be combined also with the process flow of FIG. 4 or FIG. 5, and in this case, a more detailed control is possible, and user friendliness will be improved.

In the example of FIG. 6, the secure record ON/OFF setup information confirming process of Step S600 is carried out after Steps S201, S202 and S300, however, the execution sequence is not limited thereto, and for example, Step S600 may be carried out before Step S201. In this case, the secure record ON/OFF of Step S600 is determined first, and therefore, when the secure record is OFF, i.e., when the stream data is not recorded on the hard disk but is recorded only on the server on the network, a wasteful process of confirming the remaining amount of the hard disk of Step S300 needs not be carried out.

Moreover, here, when the secure record is ON, the stream data is recorded on both the server on the network and the built-in hard disk. However, for example, if the communication state with the network is good and the stream data can be reliably recorded on the server on the network, then a control not to record the stream data on the built-in hard disk would not pose a problem.

Furthermore, the video camera may be controlled, so that while the communication state is good, the stream data may be recorded only on the server on the network, and while the communication state is bad, the stream data may be recorded on the built-in hard disk, not on the server on the network. In this case, for example, it is convenient in completing recording if the video camera is controlled so that the stream data split on the server on the network and on the built-in hard disk may be combined and recorded as one stream data on the server on the network or on the built-in hard disk.

Alternate Embodiment 4

As described above, it is convenient if even when the secure record is already set, the control content can be changed in accordance with the condition. Then, FIG. 7 shows an example in which not only the ON/OFF of the secure record can be set but a level of the secure record can be set and the control content is changed in accordance with this level.

Figure 7:
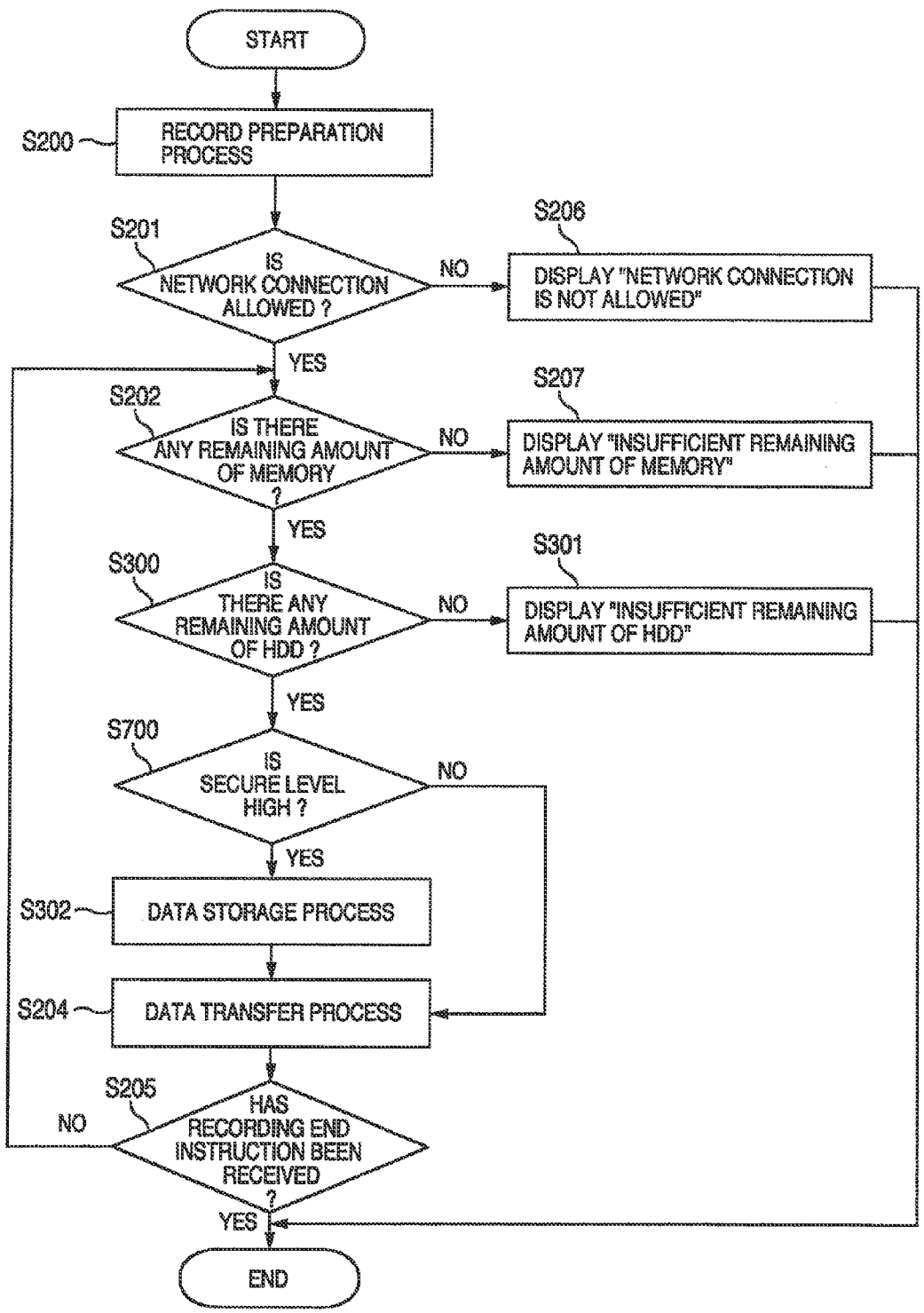
FIG. 7 is a recording control process flowchart based on a secure record level setting according to an alternate embodiment 4.

FIG. 7 is a process flow with Step S700 replacing Step S600 of FIG. 6, the process flow corresponding to the level of the secure record.

In Step S700, a user sets from a menu screen or the like of the video camera, reads the secure record level setting information stored in the memory provided by the system controller 101, and switches to a process to be carried out next in accordance with the secure record level setting information.

Note that, the secure level can be set to two levels of "high" and "low". In the example of FIG. 7, when the secure record level is set to "high", Step S302 and Step S204 are consecutively carried out and the stream data is recorded on the network server and the built-in hard disk. In this example, since the secure record level is set to "high", the video camera is controlled so as to never fail to record the stream data.

That is, even if a situation occurs in which the stream data cannot be recorded on the network server due to a bad communication state, a situation in which a user fails to record the stream data is prevented by recording the stream data on the built-in hard disk. When a user participates in an important event, such as a wedding ceremony, for example, the user will shoot in the wedding ceremony after setting the secure record level to "high" so as to never fail to record the stream data. Such type of usage can be contemplated.

On the other hand, in Step S700 of FIG. 7, if the secure record level is set to "low", the video camera is controlled so as to carry out only the process of recording the stream data to the network server in Step S204 regardless of whether the communication state is good or bad. That is, even if a situation occurs in which stream data cannot be recorded on the network server due to a bad communication state, the stream data will not be recorded on the built-in hard disk with the understanding that the stream data during this period will fail to be recorded. The advantages of setting the secure record level to "low" include, for example, that the processing load to the software and hardware of the video camera is reduced, that the operation becomes stable and is speeded up, and that the video camera requires less power as compared with the case of the secure record level set to "high" because the stream data is not recorded on the built-in hard disk.

Note that, since FIG. 7 shows an example in the case where the secure record level can be set to two levels of "high" and "low", the process flow is the same as that of FIG. 6. However, the presence or absence of the concept of the secure record level can increase the awareness of the secure record more than the awareness of simply whether or not to carry out the secure record as in FIG. 6.

Alternate Embodiment 5

The secure record level may be set further in detail in order to increase the awareness of the secure record level. For example, a secure record level "middle" may be set in addition to the secure record levels "high" and "low", wherein the stream data may be basically recorded on the network server but when the communication state is bad, the stream data may be recorded also on the built-in hard disk.

Figure 8:
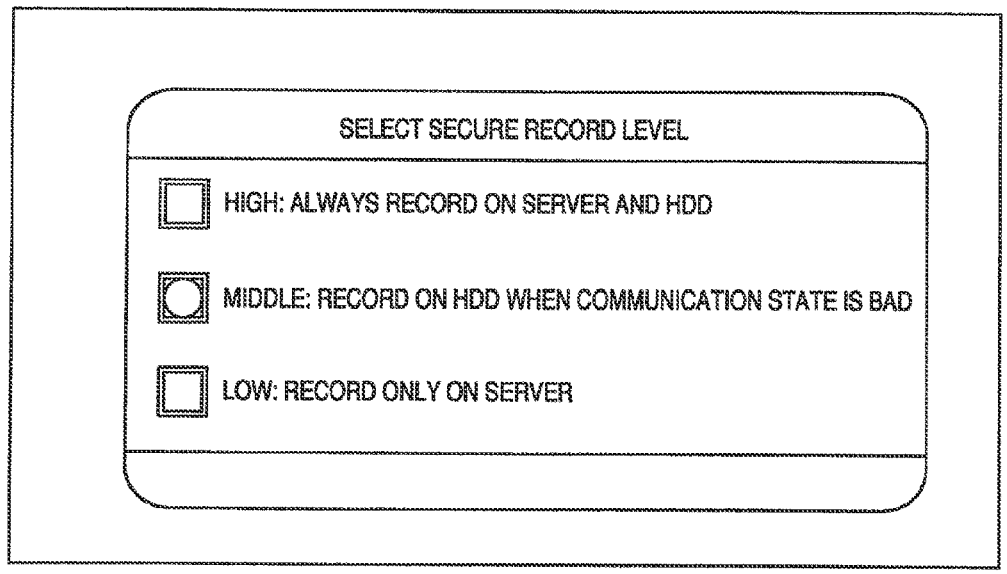
FIG. 8 is a front view showing an example of a secure record level setting screen according to an alternate embodiment 5.

In this case, it is convenient if after showing the operational overview of each level on a screen as shown in FIG. 8, a user is prompted to select the secure record level. Note that, the control content of each level described above is not limited thereto, and the control content and the recording reliability for a user may differ in accordance with the level. Of course, the expression of the secure record level is not limited to "high", "middle", and "low", and the secure record level may be expressed with "1", "2", and "3", for example. As described above, by setting the secure record level and carrying out the process corresponding to this level, user-friendliness will be improved significantly.

Figure 9:
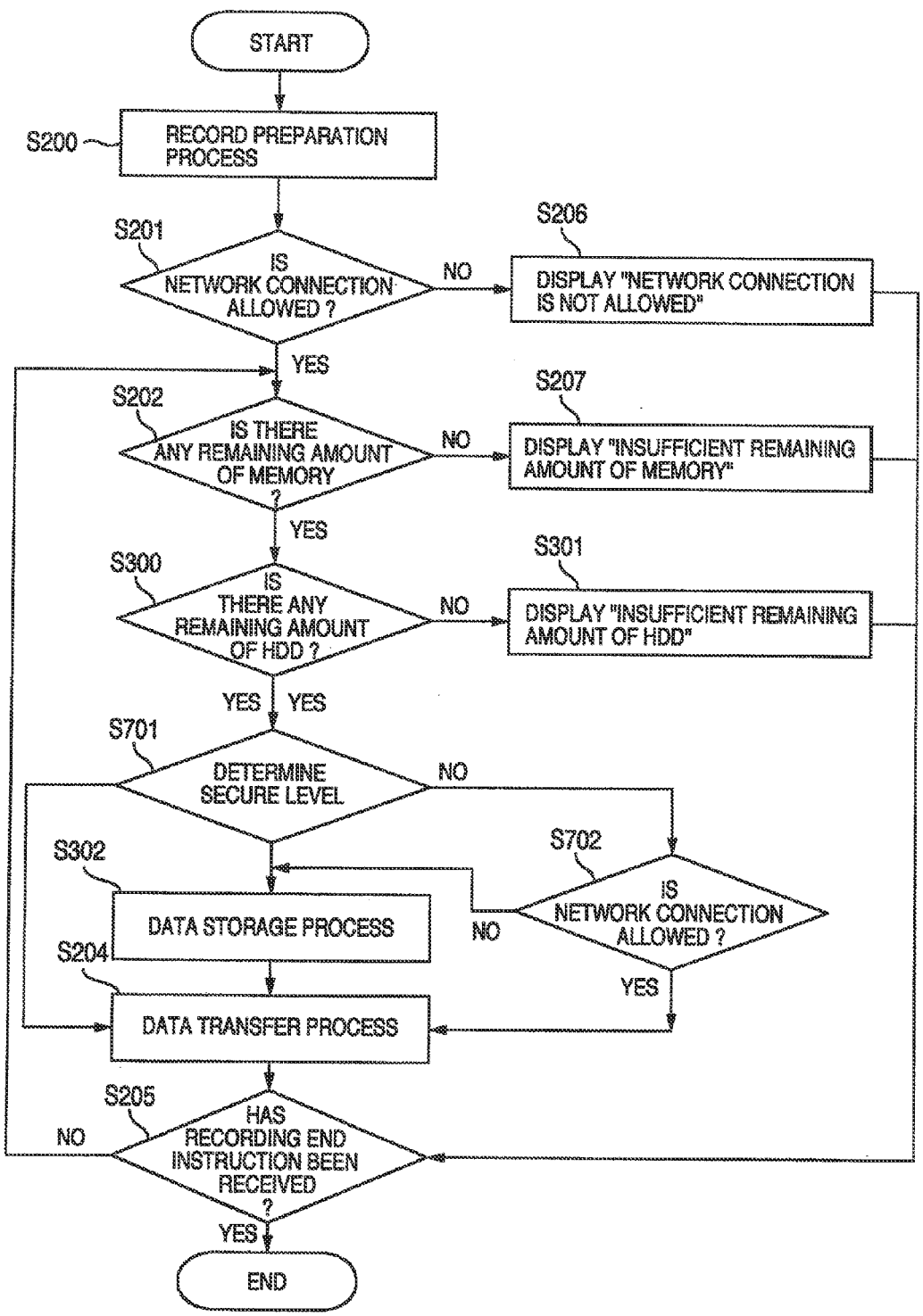
FIG. 9 is a recording control process flowchart based on a secure record level setting according to an alternate embodiment 5.

When such three-levels of secure storage are provided, the control process may be the one shown in FIG. 9. In FIG. 9, Step S700 of the process flow of FIG. 7 is replaced with Step S701, and Step S702 is added.

That is, the secure record level is determined in Step S701. If the secure record level is determined as "high" in this Step S701, the flow moves to Step S302 and the data storage process is carried out.

Moreover, if the secure record level is determined as "middle" in step S701, the flow moves to Step S702 and it is determined whether the network connection is allowed or not. If not allowed, the flow moves to Step S302 and the data storage process is carried out, while if allowed, the flow moves to Step S204 and the data transfer process is carried out.

Furthermore, if it determined as "low" in step S701, the flow moves to Step S204 and the data transfer processing is carried out.

Note that, in the example described above, the network server is set as the main archive destination and the built-in hard disk is set as an auxiliary archive destination, but not limited thereto, and the built-in hard disk may be set as the main archive destination and the network server may be set as the auxiliary archive destination. Moreover, the above-described setting may be selected from a menu screen or the like of the video camera so as to be switchable.

(Data Reproduction Procedure)

Next, the process in reproducing AV data in the network-compatible video camera 100 in the first embodiment and the second embodiment (including all the alternate embodiments) is described.

In the reproduction process, the data flow is opposite to that of the recording process. That is, the data stored in the storage unit which the server on the network has is transferred to the network controller of the video camera, and the transferred data is input to the multiplexing/demultiplexing unit and is demultiplexed into image compression data and audio compression data, and the two compressed data are subjected to the expansion process and then are output from the image input/output terminal and the audio-input/output terminal, respectively.

Here, as in the case of recording, when the communication state is bad, the data transfer from the server on the network to the video camera get stacked and the reproduction may stop in the middle of reproduction or the reproduction may become intermittent. In this way, in reproducing, viewing and listening to the AV data recorded on the network server, whether the communication state is good or bad has a great effect on whether or not the AV data can be reproduced.

Then, it is convenient if the recorded AV data can be always normally reproduced without being affected by whether the communication state is good or bad. As in the case of recording, it is convenient if there is a "secure reproduction" function to determine whether the communication state is good or bad between the video camera and the network server and reliably reproduce AV data. Setup information, such as the ON/OFF and the level, of the secure reproduction is preferably stored in the memory or the like provided by the system controller 101, as in the case of the secure record. If the secure reproduction is ON and the secure reproduction level is "high", the reproduction reliability will be improved, providing a great advantage to a user.

Figure 10:
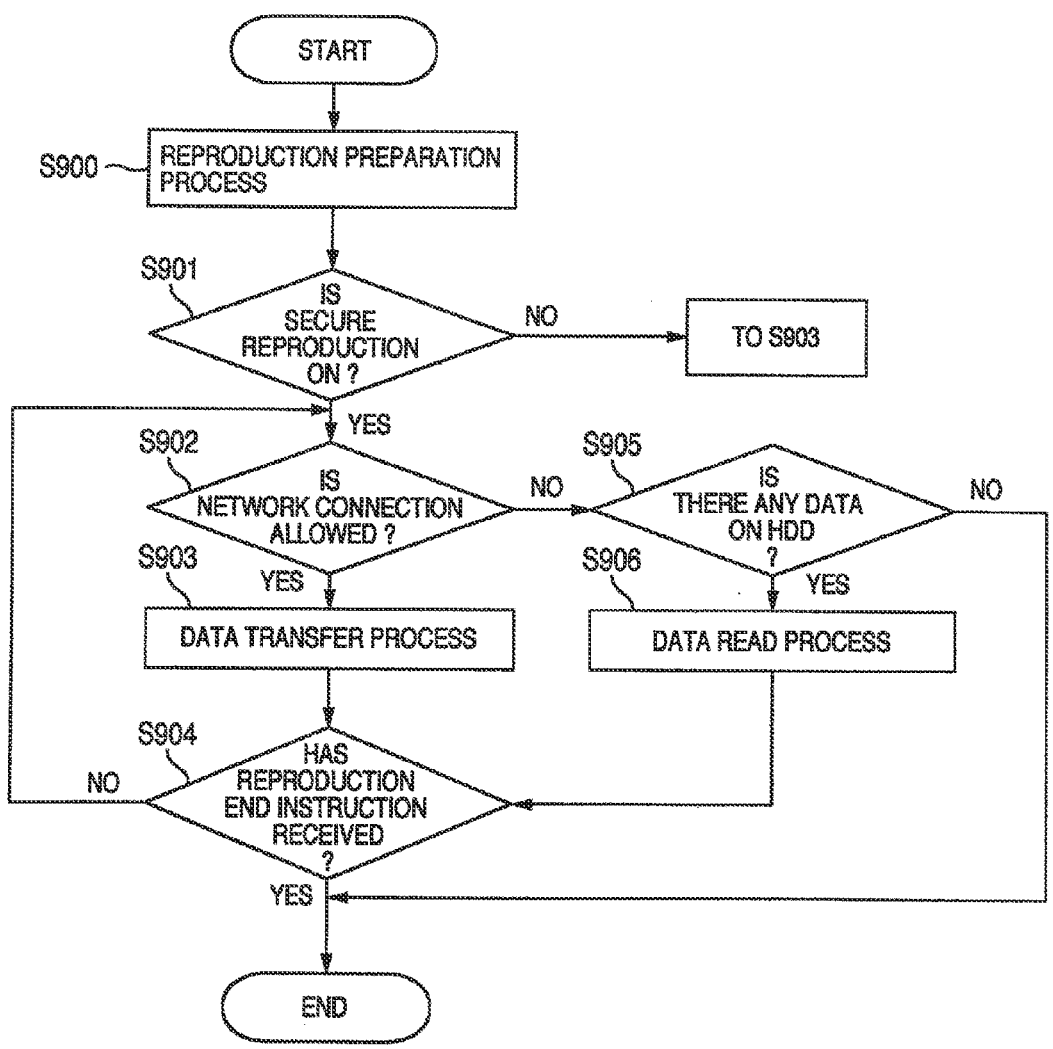
FIG. 10 is a reproduction control process flowchart based on secure reproduction setting information according to the first embodiment and the second embodiment (including all the alternate embodiments).

The reproduction control process flow based on the secure reproduction setting information is described using FIG. 10.

First, in Step S900, the reproduction preparation process is carried out. The reproduction preparation process carried out here is to read the management information of a scene which a user desires to reproduce, or to carry out the initialization process to various kinds of hardware and software.

Next, in Step S901, the secure reproduction setting information is read and the process is split in accordance with the set information. If the secure reproduction setting information is ON, the flow proceeds to Step S902 and the communication state between the video camera 100 and the server 114 on the network 111 is confirmed. If the communication state is good, the reproduction does not necessarily need to be carried out from the hard disk 109. Therefore, in Step S903, a process to retrieve the stream data from the storage unit 116 on the server 114 on the network 111 and transfer this to the video camera 100 for reproduction is carried out.

On the other hand, when the communication state is bad, if the stream data is transferred from the server 114 on the network 111 and is reproduced, the stream data is most likely not to be normally reproduced. Therefore, in Step S905, a process to check the data recorded on the hard disk 109 is carried out.

The process carried out here is to check whether or not a scene directed by a user to reproduce is recorded not only on the server 114 on the network 111 but on the hard disk 109.

For example, in the case of reproducing a scene that was recorded when the above-described secure record was ON, the same stream data is recorded not only on the server 114 on the network 111 but on the hard disk 109 and therefore the secure reproduction becomes possible. If the scene directed by a user to reproduce is recorded on the hard disk 109 in step S905, then in step S906 the stream data is read and the reproduction process is carried out. The reason for this is that the stream data cannot be normally reproduced because the communication state is bad and the transfer of the stream data from the server 114 on the network 111 gets stacked, for example, and accordingly the normal stream reproduction image is provided to a user by reading the stream data from the hard disk 109.

Moreover, if the secure reproduction function is OFF in step S901, Step S902 is skipped and the flow proceeds to Step S903. The reason for this is that since the secure reproduction function is OFF, the video camera is controlled so as to reproduce stream data from the server 114 on the network 111 regardless of whether the communication state is good or bad.

In Step S904, it is determined whether or not the reproduction end instruction from a user has been received, and if the reproduction end instruction has been received, the reproduction process is terminated, while if the reproduction instruction process has not been received yet, then the reproduction is continued by repeatedly carrying out the processes from Step S902 to Step S904.

In this way, in the case where the secure reproduction function is turned ON in advance, even if the communication state is bad and the stream data cannot be obtained from the server 114 on the network 111, the stream data can be read from the hard disk 109 and reproduced. This improves the reproduction reliability of the video camera.

Note that, in the example of FIG. 10, the video camera is controlled based on the information of the ON/OFF of the secure reproduction as the secure reproduction setting information. However, as with the secure record, the control based on the secure record level may be carried out. In this case, the control content and the reproduction reliability for a user may differ depending on the level, for example, by always reproducing from the hard disk 109, switching to the reproduction from the hard disk 109 if the stream reproduction from the network 111 has been suspended X times, reproducing from the network 111 no matter how many times the stream reproduction has been suspended, and so on.

Moreover, in order to secure the reproduction reliability, the stream data is preferably saved on the hard disk 109 as much as possible. However, since the capacity of the hard disk drive is limited and this capacity is not such large as compared with that of the server 111 or the like, the capacity may be most likely to become full. This is because if the hard disk capacity becomes full, the secure record cannot be carried out and consequently the secure reproduction cannot be carried out.

Of course, a user can designate and delete the data recorded on the hard disk 109, as the function of the camera. However, in order to improve user-friendliness further, it is preferable to include, for example, a function to automatically delete the content of the hard disk when the hard disk capacity becomes full. The priority in carrying out the automatic deletion can be variously contemplated, but the priority may be controlled based on the recording date or the like of the data, for example.

That is, the data is sequentially deleted from the older one among the data recorded on the hard disk 109, for example. Moreover, it is convenient in deleting the data if the deletion is carried out after confirming that the data to be deleted is also recorded on the server on the network.

This will not pose a big problem because even if the automatically deleted data is the data important for a user, it is recorded on the server on the network.

Note that, as the usage of video camera 100, it is generally employed to "view on the spot to shoot." Therefore, it is convenient if the video camera is controlled so that the data recorded on that day is not to be deleted as much as possible in carrying out the automatic deletion from the hard disk 109.

Moreover, the automatic deletion may be carried out only if the recording capacity of the hard disk 109 reaches a predetermined threshold value or more.

Moreover, for example, the following may occur: during recording, the communication state was good and thus data was recorded only on the server 114 on the network 111 but not recorded on the hard disk 109, but when attempting to reproduce this data, the communication state is bad and the transferring of the data recorded on the server 114 on the network 111 to the video camera 100 gets stacked and normal reproduction cannot be carried out.

Then, for example, even if the data has been recorded only on the server 114 on the network 111, the data may be transferred to the hard disk 109 choosing when the communication state is good.

This can avoid the following inconvenience, for example: during recording, the communication state was good and the data could be recorded on the server 114 on the network 111, but during reproduction, the communication state is bad and the data cannot be reproduced from the server 114 on the network 111. As a result, the reproduction reliability can be improved. For transferring the data to the hard disk choosing when the communication state is good, the transferring may be carried out when the video camera is neither recording nor reproducing, for example. This control cannot be realized unless data is transferred to the hard disk in anticipation of a user desiring to reproduce the data. If data is transferred to the hard disk 109 in a random manner, the capacity of the hard disk will become full immediately.

Then, for example, the video camera may be controlled in such a manner that when the communication state is good and also a user attempts to reproduce data, it is determined that the user desires to reproduce the data, and the data is transferred to the hard disk. Moreover, usability will be improved if detailed control is performed, for example, by setting the data to be transferred with priority to the data that was recorded on the same day as the data which the user attempted to reproduce. Of course, the data transferred to the hard disk 109 can be controlled so as to be automatically deleted next day, for example.

Similarly, when the communication state was bad and the data could be recorded only on the hard disk 109, the data recorded on the hard disk 109 may be automatically transferred to the server 114 on the network 111 after determining that the communication state has been recovered. This improves the usability without pressing the capacity of the hard disk 109.

Moreover, it is convenient in viewing data that was recorded using the video camera 100 if information indicating whether or not the data is recorded on (transferred to) the network 111 or whether or not the data is recorded on (transferred to) the hard disk 109 (transfer) is also displayed.

As described above, in the network-compatible video camera 100 of the first embodiment and the second embodiment, the recording process and reproduction process of AV data can be reliably carried out regardless of whether the communication state is good or bad. In this case, a user does not need to think about on which of the server 114 on the network 111 and the video camera's built-in hard disk 109 the AV data is recorded, and about from which the AV data is being reproduced.

Figure 11:
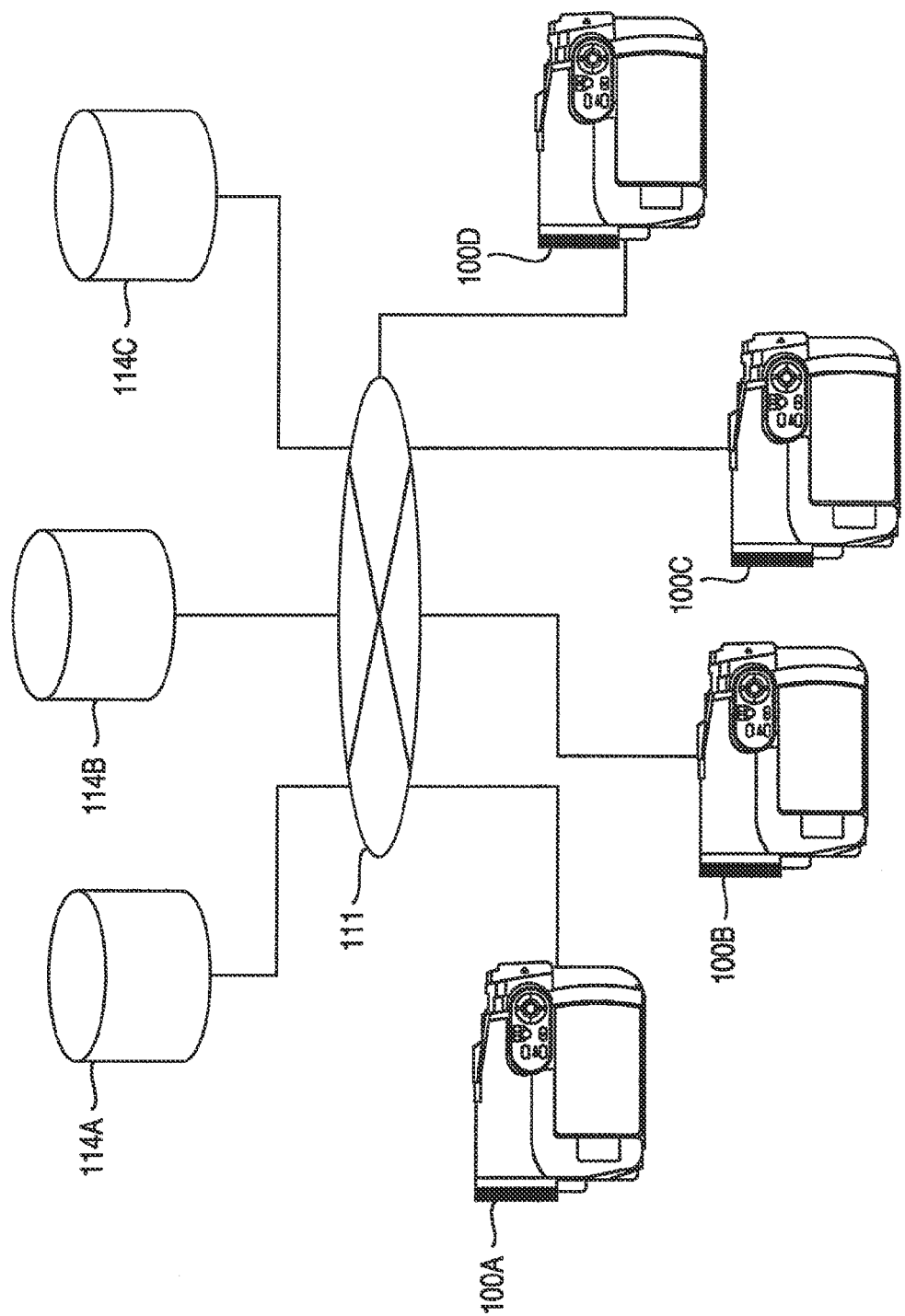
FIG. 11 is an example of business models to which the present invention is applicable, and is a schematic diagram showing an example in which a plurality of network-compatible video cameras and a plurality of servers are networked.

FIG. 11 shows an example in which a plurality of network-compatible video cameras 100A, 100B, 100C, 100D, ... are connected to the network 111, respectively, and these network-compatible video cameras mutually share a plurality of servers 114A, 114B, 114C, ... to record data. Here, if passwords or the like are known to each other in advance, mutual usage, such as that recorded information either one of the network-compatible video cameras has recorded can be read and reproduced by any other one of them, becomes possible.

As described above, according to the present invention, the transmission and reception status of the transmitting and receiving unit, the information recordable capacity of other equipment, and the recordable capacity of the recording medium are monitored, respectively, to carry out a recording control of recorded information or a reproduction control of the reproduction information. Therefore, for example, information recording, such as giving priority to the information recording onto the network server as other equipment, becomes possible and theoretically unlimited recordable capacity can be obtained while maintaining its secure nature. The recording and reproducing control of stream data is carried out based on the transmission and reception status monitored by the transmission and reception status monitoring unit, the storage status monitored by the storage capacity monitoring unit, and the recording status monitored by the recording capacity monitoring unit.

Note that, the present invention is effective in scenes where many users use the network-compatible video cameras simultaneously, in school events, such as an entrance ceremony, a graduation ceremony, an athletic meet, or an arts festival, and in celebration events, such as a birthday party, and a wedding ceremony.

Moreover, the present invention is effective not only in video cameras but in other products, such as a floor-type DVD (Digital Versatile Disc) recorder without the image sensor.

Furthermore, in the present embodiments (the first embodiment and second embodiment), a case where the hard disk 109 is incorporated into the video camera 100 has been described, however, the hard disk 109 may be a removable type one.

If the hard disk 109 is removable, then when the hard disk capacity becomes full, the hard disk 109 may be removed from the video camera 100 without deleting the data already recorded on the hard disk 109 and then the new hard disk 109 can be mounted.

Furthermore, the data recorded on the hard disk 109 can be carried about and it is therefore easy to transfer the data to other equipment. With a semiconductor memory, or an optical disc, such as a DVD, or the like in place of the hard disk 109, the same effect can be obtained. In this case, these are not incorporated into the video camera, but the video camera will be provided with a drive or a slot corresponding to the medium.

Furthermore, the type of DVD is not limited in particular. Moreover, other optical discs, such as a BD (Blue-ray Disc) and an HD (High Definition)-DVD, may be used. Moreover, the number of recording media available in the video camera 100 of the present embodiment (the first embodiment and second embodiment) does not need to be one, and the hard disk 109 and the optical disc, or the hard disk 109 and the semiconductor memory, or the optical disc and the semiconductor memory may be combined. Three or more recording media may exist in the video camera 100.

Moreover, the embodiments described above assume that the network connection is based on wireless communication, however, wired communication is also possible.

According to the present invention, a recording and reproducing apparatus capable of storing AV data reliably during recording and capable of reading the AV data reliably during reproducing even when the communication state between the video camera and a network is bad can be provided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and reproducing apparatus, the apparatus comprising:
    a transmitting and receiving unit which is configured to transmit, via a network, first video and audio information comprising image information that is input from an image sensor and audio information that is input from an audio input unit to a server which records the first video and audio information, or receives, from the server, a second video and audio information recorded in the server;
    a recording unit which is configured to record the first video and audio information or the second video and audio information to a recording medium;
    a reproducing unit that reproduces the first or the second video and audio information recorded by the recording unit; and
    a control unit which is configured to control the recording unit and the transmitting and receiving unit in accordance with one of: a first predetermined recording mode, a second predetermined recording mode or a third predetermined recording mode;
    wherein the control unit, in the first predetermined recording mode, is configured to record the first video and audio information to the recording medium and transmit the first video and audio information to the server, and
    wherein the control unit, in the second predetermined recording mode, is configured to record the first video and audio information to the recording medium or transmit the first video and audio information to the server, and
    wherein the control unit, in the third predetermined recording mode, is configured to record the first video and audio information to the recording medium in case of a communication state of the recording and reproducing apparatus in which the transmitting and receiving unit cannot transmit the first video and audio information to the server;
    in a third predetermined recording mode, the video and audio information is recorded to the recording medium only when a communication cannot be performed and a recordable capacity of the recording medium is not less than a predetermined threshold value;
    in the third predetermined recording mode, the video and audio information is recorded only to the server when a communication can be performed, and
    when the video and audio information recorded on the recording medium is deleted, a deletion is carried out after confirming that information to be deleted is also recorded on a server.

2. The recording and reproducing apparatus according to claim 1, wherein in the predetermined second recording mode, the first video and audio information is recorded to the recording medium.

3. The recording and reproducing apparatus according to claim 1, wherein in the predetermined second recording mode, the first video and audio information is transmitted to the server.

4. The recording and reproducing apparatus according to claim 2, wherein a transmission and reception status of the transmitting and receiving unit is monitored, and if the transmitting and receiving unit cannot transmit the first video and audio information, then only a recording to the recording unit is performed in the first or second predetermined recording mode.

5. The recording and reproducing apparatus according to claim 3, wherein a transmission and reception status of the transmitting and receiving unit is monitored, and if the transmitting and receiving unit cannot transmit the first video and audio information, then only a recording to the recording unit is performed in the first or second predetermined recording mode.

* * * * *